(12) United States Patent
Lee et al.

(10) Patent No.: US 12,140,734 B2
(45) Date of Patent: Nov. 12, 2024

(54) OPTICAL THIN FILM FOR META-SURFACE AND META-OPTICAL DEVICE INCLUDING THE SAME

(71) Applicant: Samsung Electronics Co., Ltd., Suwon-si (KR)

(72) Inventors: Jeongyub Lee, Yongin-si (KR); Changseung Lee, Yongin-si (KR); Kideok Bae, Seoul (KR); Eunhyoung Cho, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1297 days.

(21) Appl. No.: 16/789,675

(22) Filed: Feb. 13, 2020

(65) Prior Publication Data

US 2021/0088694 A1    Mar. 25, 2021

(30) Foreign Application Priority Data

Sep. 24, 2019 (KR) .......................... 10-2019-0117484

(51) Int. Cl.
| | |
|---|---|
| *G02B 1/00* | (2006.01) |
| *C01G 15/00* | (2006.01) |
| *C01G 28/00* | (2006.01) |
| *G02B 1/14* | (2015.01) |
| *G02B 5/18* | (2006.01) |

(Continued)

(52) U.S. Cl.
CPC ............... *G02B 1/14* (2015.01); *C01G 15/00* (2013.01); *C01G 28/00* (2013.01); *G02B 1/002* (2013.01); *G02B 5/1809* (2013.01); *G02B 5/20* (2013.01); *G02B 27/10* (2013.01); *B82Y 20/00* (2013.01);

(Continued)

(58) Field of Classification Search
CPC . G02B 1/002; G02B 1/14; G02B 5/20; G02B 27/10; B82Y 20/00
See application file for complete search history.

(56) References Cited

U.S. PATENT DOCUMENTS

| | | | |
|---|---|---|---|
| 6,040,936 | A | 3/2000 | Kim et al. |
| 7,750,869 | B2 | 7/2010 | Mosallaei |

(Continued)

FOREIGN PATENT DOCUMENTS

| | | |
|---|---|---|
| KR | 10-2017-0112915 A | 10/2017 |
| KR | 10-2018-0015489 A | 2/2018 |

(Continued)

OTHER PUBLICATIONS

M. Khorasaninejad et al. 'Metalenses at visible wavelengths: Diffraction-limited focusing and subwavelength resolution imaging' Science, Jun. 3, 2016, vol. 352, Issue 6290, pp. 1190-1194.

(Continued)

*Primary Examiner* — Bijan Ahvazi
(74) *Attorney, Agent, or Firm* — Harness, Dickey & Pierce, P.L.C.

(57) ABSTRACT

An optical thin film includes a support layer and a dielectric layer on the support layer. The dielectric layer has a refractive index greater than that of the support layer. The dielectric layer includes a compound ADX, which includes a Group 3 element A, a Group 5 element D, and an element X having an atomic weight smaller than an atomic weight of A or D. The optical thin film may exhibit light transmission having a high refractive index and low absorptivity.

14 Claims, 8 Drawing Sheets

(51) Int. Cl.
*G02B 5/20* (2006.01)
*G02B 27/10* (2006.01)
*B82Y 20/00* (2011.01)

(52) U.S. Cl.
CPC ......... *C01G 15/006* (2013.01); *C01G 28/002* (2013.01); *G02B 2207/101* (2013.01)

(56) References Cited

U.S. PATENT DOCUMENTS

| | | |
|---|---|---|
| 10,459,258 B2 | 10/2019 | Baik et al. |
| 2006/0083283 A1 | 4/2006 | Kondo |
| 2009/0040132 A1 | 2/2009 | Sridhar et al. |
| 2010/0091224 A1* | 4/2010 | Cho ................. G02B 5/201 359/589 |
| 2018/0224574 A1* | 8/2018 | Lee ................. C23C 14/0617 |
| 2020/0051263 A1 | 2/2020 | Han et al. |
| 2021/0159670 A1 | 5/2021 | Na et al. |

FOREIGN PATENT DOCUMENTS

| | | |
|---|---|---|
| KR | 10-2018-0090613 A | 8/2018 |
| KR | 10-2018-0107945 A | 10/2018 |

OTHER PUBLICATIONS

A.Arbabi et al. 'Subwavelength-thick lenses with high numerical apertures and large efficiency based on high-contrast transmitarrays' *Nature Communications*, May 7, 2015, 6:7069, pp. 1-6.
R. E. Nahory et al. 'Band gap versus composition and demonstration of Vegard's law for $In_{1-x}Ga_xAs_yP_{1-y}$ lattice matched to InP' *Applied Physics Letters*, 33, Oct. 1, 1978, pp. 659-661.
S. Adachi. 'GaAs and Related Materials: Bulk Semiconducting and Superlattice Properties' *World Scientific*, 210.109.226.130, 1994, 19 pages.
D.E. Aspnes et al., 'Optical properties of $Al_xGa_{1-x}As$' *Journal of Applied Physics*, vol. 60, No. 2, 1986, pp. 754-767.
S. Adachi, GaAs, AlAs, and $Al_xGa_{1-x}As$@B: Material parameters for use in research and device applications' *Journal of Applied Physics*, vol. 58, No. 3, 1985, pp. R1-R29.
Korean Office Action for corresponding Korean Patent Application No. 10-2019-0117484 issued on Sep. 1, 2023 and English translation thereof.

* cited by examiner

OPTICAL THIN FILM FOR META-SURFACE AND META-OPTICAL DEVICE INCLUDING THE SAME

CROSS-REFERENCE TO RELATED APPLICATION

This application claims the benefit of Korean Patent Application No. 10-2019-0117484, filed on Sep. 24, 2019, in the Korean Intellectual Property Office, the disclosure of which is incorporated herein in its entirety by reference.

BACKGROUND

1. Field

Embodiments of the present disclosure relate to an optical thin film for a meta-surface and a meta-optical device including the same.

2. Description of Related Art

A meta-structure is an artificial structure having a dimension smaller than the wavelength of incident light, wherein the dimension is applied to a thickness, a pattern, or a period, and exhibits optical characteristics that exceed physical constraints of diffraction.

Materials with a high refractive index and low absorptivity (extinction coefficient) are preferred for light in the desired wavelength band to form meta-structures, but the refractive index and the absorptivity tend to be proportional to each other. Thus, it is difficult to obtain a material that meets the two requirements.

For example, silicon (Si) exhibits a refractive index of 3.5 and an extinction coefficient of no more than $1\times10^{-3}$ for light in the 1,550 nm wavelength band, but has greatly increased absorptivity of light in the visible light wavelength band, making it difficult to apply to optical devices. $TiO_2$, which exhibits an extinction coefficient of $1\times10^{-5}$ or less for light in the visible light wavelength band, has a maximum known refractive index of only about 2.45 for light in the visible light wavelength band.

SUMMARY

An optical thin film having a high refractive index and a low absorptivity is provided.

A meta-optical device utilizing an optical thin film is provided.

Additional aspects will beset forth in part in the description which follows and, in part, will be apparent from the description, or may be learned by practice of the presented embodiments of the disclosure.

An aspect provides an optical thin film including: a support layer and a dielectric layer on the support layer. The dielectric layer may have a refractive index greater than that of the support layer, and may a compound ADX including a Group 3 element A, a group 5 element D, and an element X having an atomic weight smaller that of A or D.

In some embodiments, the compound ADX may include GaPX or AlAsX.

In some embodiments, the element X may be Al, N, P, or O.

In some embodiments, the compound ADX may include $GaN_aP_{1-a}$ (0<a<1) or $Al_aGa_{1-a}P$ (0<a<1).

In some embodiments, the compound ADX includes $AlAs_{1-b}Y_b$ (0<b<1), and Y may be P or N.

In some embodiments, the compound ADX may include $GaP_aO_b$ (0<a<1, 0<b<1) or $AlAs_aO_b$ (0<a<1, 0<b<1).

In some embodiments, the compound ADX may include $GaN_aP_bO_c$ (0<a, b, c<1) or $AlGa_aP_bO_c$ (0<a, b, c<1).

In some embodiments, the compound ADX may include $AlAs_{1-b}Y_b$ (0<b<1), and Y may be P or N.

In some embodiments, the compound ADX may include $AlAs_aY_bO_c$ (0<a, b, c<1), and Y may be P or N.

In some embodiments, the compound ADX may include $Al_xGa_yN_zP_w$ (x+y=z+w, 0<x, y, z, w<1), $Ga_xAs_yN_zP_w$ (x=y+z+w, 0<x, y, z, w<1), $Al_xAs_yN_zP_w$ (x=y+z+w, 0<x, y, z, w<1), $Al_xGa_yAs_zN_w$ (x+y=z+w, 0<x, y, z, w<1), $Al_xGa_yAs_zP_w$ (x+y=z+w, 0<x, y, z, w<1), or $Al_xGa_yAs_zN_wP_v$ (x+y=z+w+v).

In some embodiments, the compound ADX may include $Al_xGa_yN_zP_wO_v$ (0<x, y, z, w, v<1), $Ga_xAs_yN_zP_wO_v$ (0<x, y, z, w, v<1), $Al_xAs_yN_zP_wO_v$ (0<x, y, z, w, v<1), $Al_xGa_yAs_zN_wO_v$ (0<x, y, z, w, v<1), $Al_xGa_yAs_zP_wO_v$ (0<x, y, z, w, v<1), or $Al_xGa_yAs_zN_wP_vO_u$ (0<x, y, z, w, v, u<1).

In some embodiments, in a compound AD including the Group 3 element A and the Group 5 element D of ADXa (0<a<1), elements A and D may be set such that the compound AD may have a refractive index of greater than 3.3 and an absorptivity of less than 0.05 for light in a visible wavelength range.

In some embodiments, in the compound ADX, A, D, and X may be set such that the ADXa (0<a<1) has a refractive index of greater than 3 and an absorptivity of less than $3\times10^{-3}$ for light in a visible wavelength band.

In addition, another aspect provides a meta-optical device including: a support layer; and a plurality of nanostructures arranged to form a shape distribution for changing a phase of incident light according to a desired rule according to positions. The plurality of nanostructures each may include a compound ADX including a Group 3 element A, a Group 5 element D, and an element X having an atomic weight smaller than that of A or D, and having a shape dimension smaller than the wavelength of the incident light In some embodiments, the compound ADX may include GaPX or AlAsX.

In some embodiments, X may be Al, N, P, or O.

In some embodiments, the compound ADX may include $GaN_aP_{1-a}$ (0<a<1), $Al_aGa_{1-a}P$ (0<a<1), $AlAs_{1-b}P_b$ (0<b<1), or $AlAs_{1-b}N_b$ (0<b<1).

In some embodiments, the compound ADX may include $GaP_aO_b$ (0<a<1, 0<b<1), $AlAs_aO_b$ (0<a<1, 0<b<1), $GaN_aP_bO_c$ (0<a, b, c<1), $AlGa_aP_bO_c$ (0<a, b, c<1), $AlAs_aP_bO_c$ (0<a, b, c<1), or $AlAs_aN_bO_c$ (0<a, b, c<1).

In some embodiments, the wavelength of the incident light may be from 300 nm to 1000 nm.

In some embodiments, the nanostructures may each have a columnar shape, a polygonal columnar shape, or a stripe shape.

In some embodiments, the meta-optical device may further include a protective layer formed of a material having a refractive index smaller than the refractive index of the compound ADX and formed to cover the plurality of nanostructures.

In some embodiments, the plurality of nanostructures may be arranged in a plurality of layers spaced apart from the support layer by different distances.

In some embodiments, a shape distribution of the plurality of nanostructures may be set such that the meta-optical device is configured to function as a concave lens, a convex lens, a beam deflector, a beam splitter, a resonator, or a color filter.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
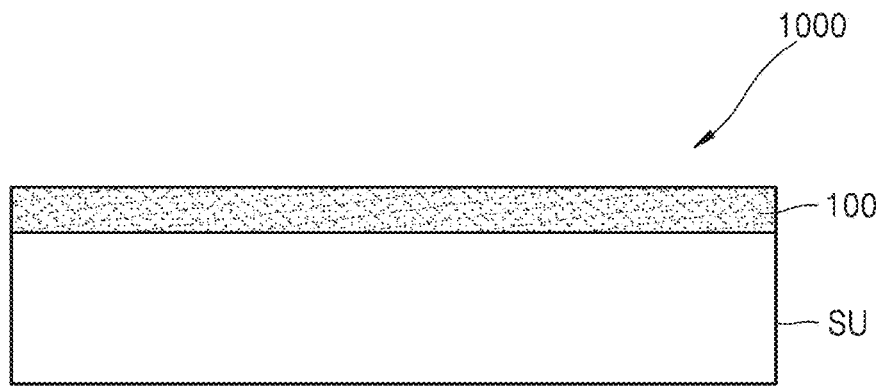
FIG. 1 is a cross-sectional view showing a schematic structure of an optical thin film according to an embodiment of the present disclosure.

Reference will now be made in detail to embodiments, examples of which are illustrated in the accompanying drawings, wherein like reference numerals refer to like elements throughout. In this regard, inventive concepts may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, what is described as "above" or "on" may include not only directly over and in contact but also overlying.

The terms first, second, etc. may be used to describe various components, but are only used to distinguish one component from another component. These terms do not limit the substance or structure of the components.

Singular expressions include plural expressions unless the context clearly indicates otherwise. In addition, when a part is said to "include" a certain component, this means that it may further include other components, except to exclude other components unless otherwise stated.

In addition, the terms " . . . unit", "module", etc. described in the specification mean a unit that processes at least one function or operation, which may be implemented by hardware or software or a combination of hardware and software.

The use of the term "above" and similar terminology may be used in the singular and the plural.

Unless explicitly stated that the steps constituting the method should be performed in the order described, the steps may be performed in a suitable order. In addition, the use of all example terms (e.g., etc.) is merely for the purpose of describing the technical spirit in detail, and the scope of rights is not limited by these terms unless limited by the claims.

FIG. 1 is a cross-sectional view showing a schematic structure of an optical thin film according to an embodiment.

The optical thin film 1000 includes a support layer SU and a dielectric layer 100 on the support layer SU, the dielectric layer 100 having a refractive index greater than that of the support layer SU.

The support layer SU may be a transparent substrate. The support layer SU may be, for example, a glass substrate, a silicon oxide ($SiO_2$) substrate, or a polymer substrate such as polymethyl methacrylate (PMMA) or polydimethylsiloxane (PDMS), or silicon (Si).

The dielectric layer 100 may be patterned with a meta-surface and applied to various meta-optical devices. The dielectric layer 100 may be made of a material having a refractive index and absorptivity suitable for light in a desired wavelength band.

The meta-surface may be subjected to a desired and/or alternatively predetermined phase shift determined according to its position and may be formed of a material having an appropriate refractive index and appropriate absorptivity in order to have low light transmission performance. Here, the appropriate refractive index and absorptivity mean a high refractive index and low absorptivity, for example, a refractive index greater than 3 and an extinction coefficient k smaller than $3 \times 10^{-3}$ for a desired wavelength of light to be modulated. Hereinafter, the expressions of absorptivity, extinction coefficient, and k may be used interchangeably. The wavelength band may be in a range of about 300 nm to about 1,000 nm. The wavelength band may be in a range of about 750 nm to about 1,000 nm, which may be a near-infrared band. Alternatively, the wavelength band may be in the visible light band in a range of about 400 nm to about 750 nm.

The dielectric layer 100 may include a compound doped with a desired and/or alternatively predetermined element in a Group III-V compound. Such a compound may be ADX including a Group 3 element A, a Group 5 element D, and an element X having an atomic weight less than that of A or D.

Constructing the dielectric layer 100 as such overcomes the limitation shown in typical low-loss ($k<10^{-3}$) dielectric materials with a low refractive index of less than about 2.5, and typical Group III-V compounds having a refractive index of greater than about 3 with a high absorptivity (k) as $3 \times 10^{-3}$.

Hereinafter, this will be described in more detail with reference to Tables 1 to 3.

Table 1 below shows the bandgap energy, the refractive index (n), and the absorptivity (k) for dielectrics at a light of a wavelength of 450 nm.

TABLE 1

| Dielectrics | n @ 450 nm | k @ 450 nm | Band gap [eV] |
|---|---|---|---|
| AlSb | 5.23 | 1.24 | 1.58 |
| GaAs | 4.69 | 0.7 | 1.42 |
| InAs | 4.22 | 0.85 | 0.35 |
| InP | 4 | 0.67 | 1.35 |
| GaP | 3.88 | 0.03 | 2.26 |
| AlAs | 3.47 | $3.3 \times 10^{-3}$ | 2.21 |
| AlP | 2.98 | $<1 \times 10^{-3}$ | 2.5 |
| GaN | 2.47 | $<1 \times 10^{-3}$ | 3.39 |
| AlN | 2.18 | $<1 \times 10^{-3}$ | 6.02 |

As shown in the above table, the refractive index (n @ 450 nm) and the absorptivity (k @ 450 nm) tend to be proportional to each other. In other words, a material having a high refractive index also has a high absorptivity, and the desired high refractive index and low absorptivity are not satisfied.

According to an embodiment, the dielectric layer 100 may include ADXa (wherein 0<a<1), wherein A and D may be selected from Group III-V compounds not exhibiting the desired high refractive index and low absorptivity and of which the refractive index or the absorptivity may be controlled within the desired range by alloying with other alloying elements. For example, A and D may be set such that the compound AD including Group 3 element A and Group 5 element D has a refractive index of greater than 3.3 and absorption of less than 0.05 for light in the visible wavelength range. Such compound AD may be GaP or AlAs, as shown in Table 1.

As shown in Table 1, the refractive index of GaP and AlAs may be in a suitable range, but the absorptivity thereof may be relatively high. However, such absorptivity may be improved by alloying with other alloying elements, and the alloying elements may be elements having a relatively small atomic weight. For example, an alloying element to be added to GaP may be an element having an atomic weight smaller than an atomic weight of Ga or P, and an alloying element to be added to AlAs may be an element having an atomic weight smaller than an atomic weight of Al or As. Such alloying elements may be Group 3 or Group 5 elements, and may be elements of Groups 2 and 6, both of which have similar outermost electron numbers. Such alloying elements may be, for example, Al, P, N, or O. However, this an example and inventive concepts are not limited thereto. By containing such alloying elements in GaP and AlAs at an appropriate ratio, the refractive index and the absorptivity may be lowered. The amount of the alloying element added to GaP or AlAs may be determined such that the absorptivity may be reduced to less than $3 \times 10^{-3}$, and the reduced refractive index may be greater than 3.

Tables 2 and 3 show the bandgap energy, refractive index, and absorptivity of various Group III-V compounds in order of increasing atomic weight.

TABLE 2

| (III-V) | Dielectrics | n @ 450 nm | k @ 450 nm | Band gap [eV] |
|---|---|---|---|---|
| Al-V | AlN | 2.18 | $<1 \times 10^{-3}$ | 6.02 |
|  | AlP | 2.98 | $<1 \times 10^{-3}$ | 2.5 |
|  | AlAs | 3.47 | $3.3 \times 10^{-3}$ | 2.21 |
|  | AlSb | 5.23 | 1.24 | 1.58 |
| Ga-V | GaN | 2.47 | $<1 \times 10^{-3}$ | 3.39 |
|  | GaP | 3.88 | 0.03 | 2.26 |
|  | GaAs | 4.69 | 0.70 | 1.42 |
|  | GaSb | 3.84 | 2.21 | 0.73 |
| In-V | InP | 4 | 0.67 | 1.35 |
|  | InAs | 4.22 | 0.85 | 0.35 |
|  | InSb | 3.36 | 2.06 | 0.17 |

Referring to Table 2, the larger the atomic weight of the Group 5 element bonded to Al, the greater the refractive index (n) and the absorptivity (k) and the lower the band gap energy. A similar tendency may be observed for a Group 5 element bonded with Ga and a Group 5 element bonded with In.

TABLE 3

| (III-V) | Dielectrics | n @ 450 nm | k @ 450 nm | Band gap [eV] |
|---|---|---|---|---|
| III-N | AlN | 2.18 | $<1 \times 10^{-3}$ | 6.02 |
|  | GaN | 2.47 | $<1 \times 10^{-3}$ | 3.39 |
| III-P | AlP | 2.98 | $<1 \times 10^{-3}$ | 2.50 |
|  | GaP | 3.88 | 0.03 | 2.26 |
|  | InP | 4 | 0.67 | 1.35 |
| III-As | AlAs | 3.47 | $3.3 \times 10^{-3}$ | 2.21 |
|  | GaAs | 4.69 | 0.70 | 1.42 |
|  | InAs | 4.22 | 0.85 | 0.35 |
| III-Sb | AlSb | 5.23 | 1.24 | 1.58 |
|  | GaSb | 3.84 | 2.21 | 0.73 |
|  | InSb | 3.36 | 2.06 | 0.17 |

Referring to Table 3, the larger the atomic weight of a Group 3 element bonded to N, the greater the refractive index (n) and the absorptivity (k) and the lower the band gap energy. A similar tendency may be observed for a Group 3 element bonded to P and a Group 3 element bonded to As.

From the analysis results, GaP or AlAs may be selected as a compound having easily adjustable ranges of refractive index and absorptivity, and as an alloying element to be added to GaP and AlAs, X may be Al, N, P, or O, each having a relatively small atomic weight. The amount of X may be set such that the absorptivity is effectively reduced and the decrease in the refractive index occurs less. Since the absorptivity tends to be inversely proportional to the bandgap energy, reference may be made to known equations for estimating the bandgap energy according to the composition ratio of the Group III-V compound.

The dielectric layer 100, may include $GaN_aP_{1-a}$ ($0<a<1$) as the compound described above. The range of a may be $0.1<a<0.9$.

The dielectric layer 100 may include $Al_aGa_{1-a}P$ ($0<a<1$). The range of a may be $0.1<a<0.9$.

The dielectric layer 100 may include $AlAs_{1-b}Y_b$ ($0<b<1$), and Y may be P or N. The range of b may be $0.1<b<0.9$.

The dielectric layer 100 may include $GaP_aO_b$ ($0<a<1$, $0<b<1$) or $AlAs_aO_b$ ($0<a<1$, $0<b<1$). Since the element oxygen (O) has a greater number of outermost electrons than Group 5 element P or As, the content ratio of O may be determined such that a+b is less than 1. The range of a and b may be $0.1<a<0.9$ and $0.1<b<0.9$.

The dielectric layer 100 may include $GaN_aP_bO_c$ ($0<a, b, c<1$) or $Al_aGa_{1-a}P_bO_c$ ($0<a, b, c<1$).

The dielectric layer 100 may include $AlAs_aP_bO_c$ ($0<a, b, c<1$) or $AlAs_aN_bO_c$ ($0<a, b, c<1$).

The dielectric layer 100 may include $Al_xGa_yN_zP_w$ ($x+y=z+w$, $0<x, y, z, w<1$), $Ga_xAs_yN_zP_w$ ($x=y+z+w$, $0<x, y, z, w<1$), $Al_xAs_yN_zP_w$ ($x=y+z+w$, $0<x, y, z, w<1$), $Al_xGa_yAs_zN_w$ ($x+y=z+w$, $0<x, y, z, w<1$), $Al_xGa_yAs_zP_w$ ($x+y=z+w$, $0<x, y, z, w<1$), or $Al_xGa_yAs_zN_wP_v$ ($x+y=z+w+v$).

The dielectric layer 100 may be $Al_xGa_yN_zP_wO_v$ ($0<x, y, z, w, v<1$), $Ga_xAs_yN_zP_wO_v$ ($0<x, y, z, w, v<1$), $Al_xAs_yN_zP_wO_v$ ($0<x, y, z, w, v<1$), $Al_xGa_yAs_zN_wO_v$ ($0<x, y, z, w, v<1$), $Al_xGa_yAs_zP_wO_v$ ($0<x, y, z, w, v<1$), or $Al_xGa_yAs_zN_wP_vO_u$ ($0<x, y, z, w, v, u<1$)

In addition to the described examples, the dielectric layer 100 may be added to a Group III-V compound AD such that the dielectric layer may include other types of compounds having the alloying element X, wherein the alloying element X may minimize or reduce the reduction in refractive index and may effectively lower the absorptivity.

Figure 2A:
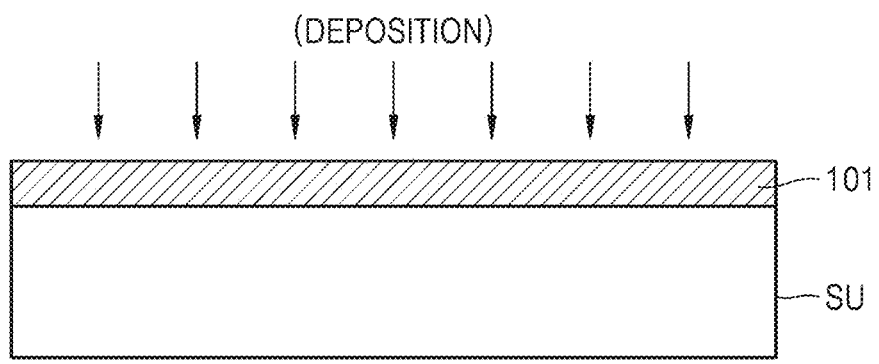
FIGS. 2A to 2D are views illustrating a method of manufacturing an optical thin film according to an embodiment of the present disclosure.
Figure 2B:
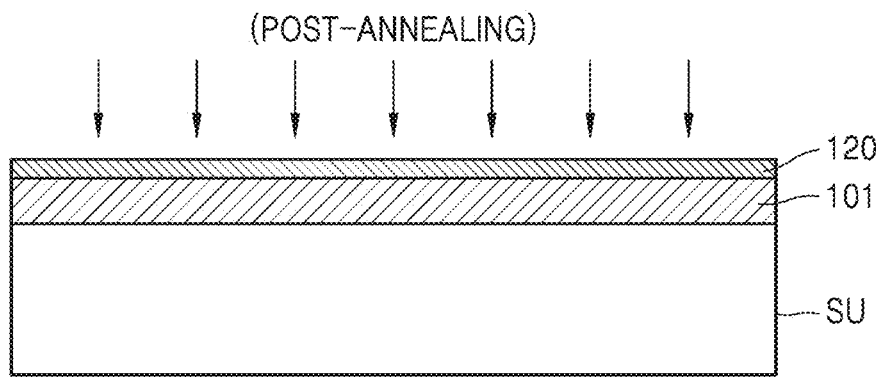
Figure 2C:
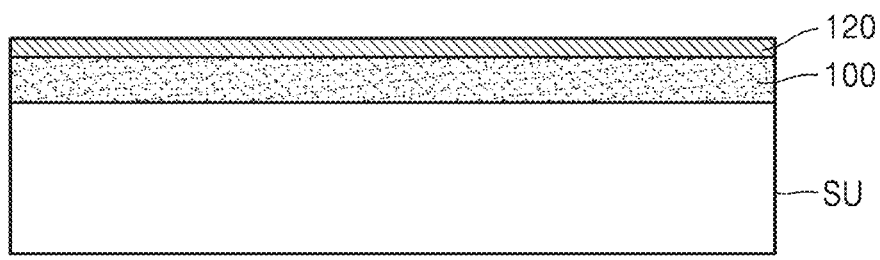
Figure 2D:
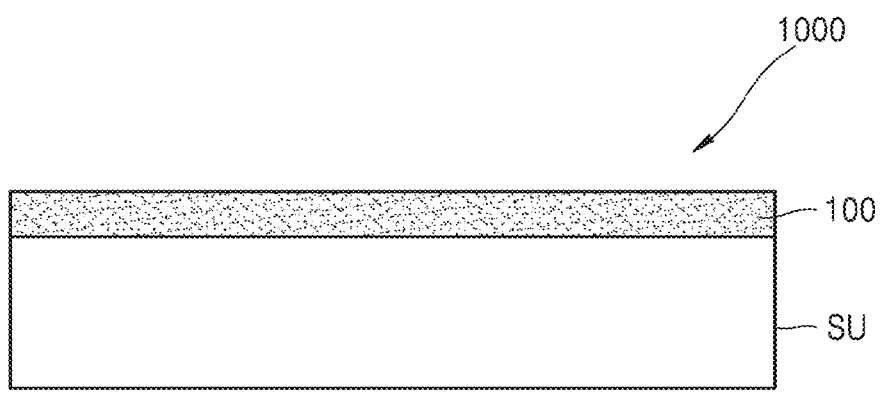
Figure 3:
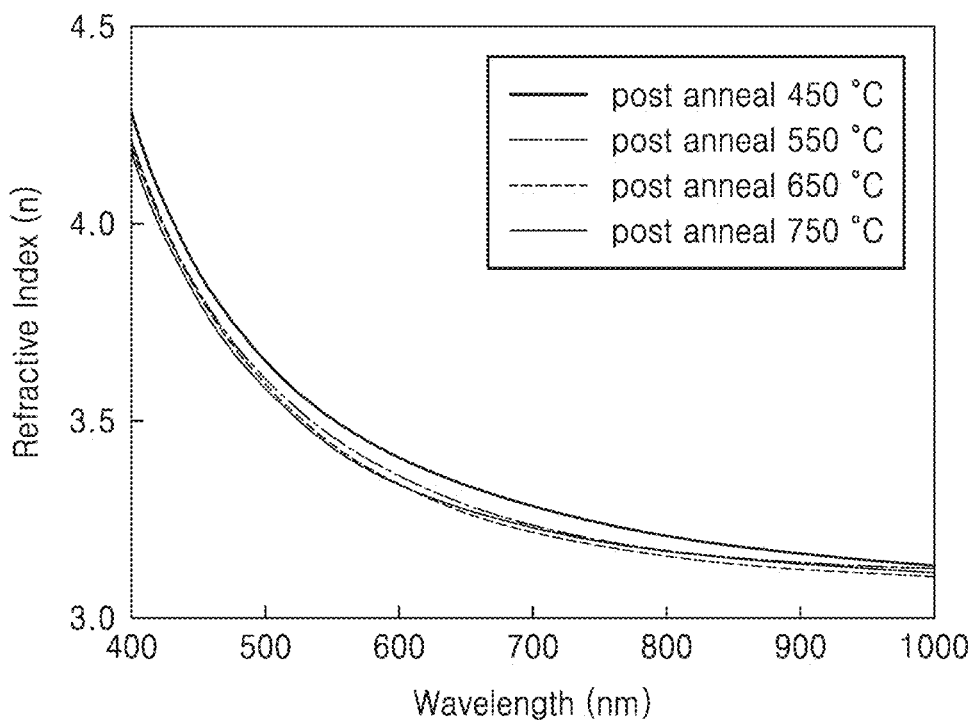
FIGS. 3 and 4 are graphs exemplarily showing that the refractive index and the extinction coefficient of a Group 3-5 compound vary according to the post annealing temperature.
Figure 4:
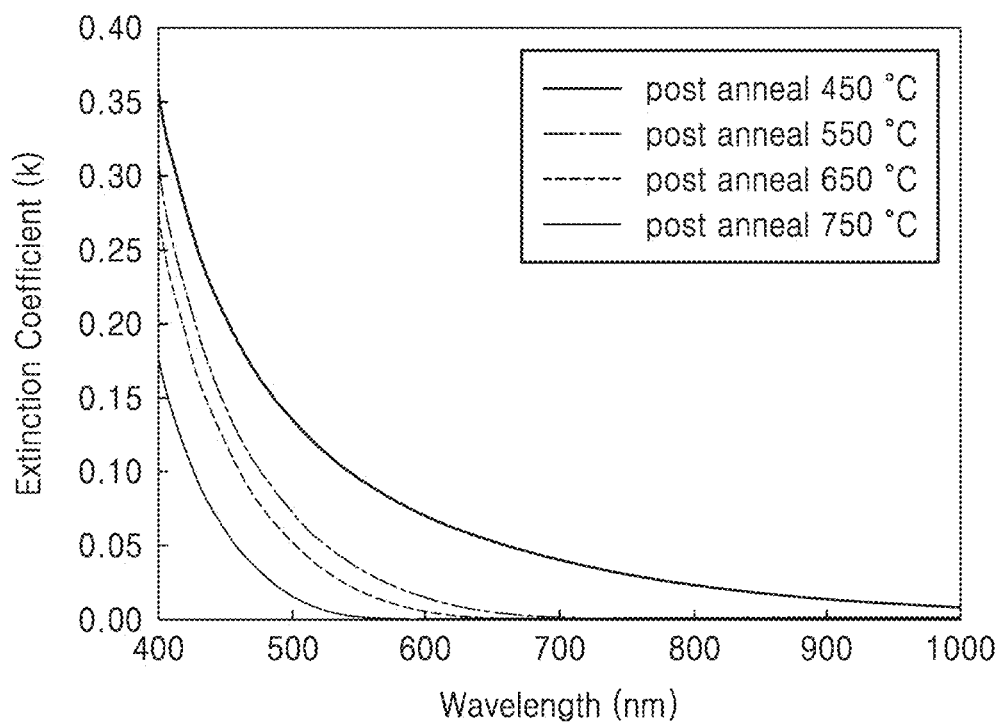

FIGS. 2A to 2D are diagrams schematically illustrating a method of manufacturing an optical thin film according to an embodiment, and FIGS. 3 and 4 illustrate examples of changes in the refractive index and the extinction coefficient according to post annealing temperature for a GaP layer.

Referring to FIG. 2A, the support layer SU may be prepared, and the dielectric layer 101 may be formed on the support layer SU. The support layer SU may be a transparent substrate such as a glass substrate, a silicon oxide ($SiO_2$) substrate, or a polymer substrate as polymethyl methacrylate (PMMA) or polydimethylsiloxane (PDMS), or silicon (Si).

The dielectric layer 101 may be a compound layer to be formed having a high refractive index and low absorptivity as described above and may be a compound in which an alloying element X having a small atomic weight is mixed with a Group III-V compound. For the formation of the dielectric layer 101, a non-epitaxial deposition process using a sputtering process may be used. For the formation of the dielectric layer 101, metal-organic chemical vapor deposition (MOCVD) may also be used, but the sputtering process may be used in some embodiments because the MOCVD requires an additional buffer layer for epitaxial growth, and the MOCVD is a relatively high temperature process, which makes it difficult to reduce surface roughness (RMS).

Sputtering power, sputtering pressure, Ar flow rate, operating time, and the like may be appropriately set in consideration of the specific composition and thickness of the compound constituting the dielectric layer 101.

As shown in FIG. 2B, since the dielectric layer 101 formed as described above is not crystallized so a crystallization process by post annealing may be used.

As shown in FIG. 2B, anti-oxidant layer 120 may be formed over the dielectric layer 101 before the crystallization process, to limit and/or prevent the oxidation of the dielectric layer 101 in the crystallization process. For example, the anti-oxidant layer 120 may be formed of $SiO_2$, $Si_3N_4$, $TiO_2$, or ITO. When the anti-oxidant layer 120 is excessively thin, antioxidation may not be provided. When the anti-oxidation layer 120 is too thick, there is a possibility that the process wafer including a substrate SU, dielectric layer 101, and the anti-oxidation layer 120 may be damaged due to stress accumulated in the anti-oxidation layer 120 during the process. Therefore, the thickness of the anti-oxidant layer 120 may be, for example, about 50 nm to about 1 μm. The process of forming the anti-oxidant layer 120 is not particularly limited, for example, the $SiO_2$ layer may be formed by plasma-enhanced chemical vapor deposition (PECVD).

The crystallization process may be performed by post annealing the dielectric layer 101 in an inert gas atmosphere, for example, an argon atmosphere. The post annealing temperature may be determined in consideration of the crystallization temperature of the Group III-V compound constituting the dielectric layer 101. In addition, the post annealing temperature may be determined in consideration of the change in the refractive index and extinction coefficient caused by the alloying element material added to the Group III-V compound. The extinction coefficient tends to become smaller as the post annealing temperature rises. The refractive index tends to be become somewhat smaller as the post annealing temperature rises. The lowest post annealing temperature may be determined so that the desired extinction coefficient and refractive index may be obtained.

For example, referring to FIG. 3, the refractive index of GaP slightly decreases in the wavelength band of 400 to 1,000 nm as the post annealing temperature increases.

In addition, referring to FIG. 4, the extinction coefficient of GaP decreases relatively rapidly in the wavelength band of 400 to 1,000 nm, particularly in the visible light wavelength band, as the post annealing temperature increases.

From such tendency as shown, it may be seen that by post annealing the dielectric layer 101 having the alloying element X mixed with the Group III-V compound, the decrease in refractive index may be reduced, and the decrease in absorptivity may be increased, achieving the desired refractive index and absorptivity amount or range thereof.

On the other hand, when the post annealing temperature is substantially high, the constituent elements of the Group III-V compound may thermally dissociate. Therefore, the highest post annealing temperature is determined such that the post annealing temperature does not exceed the thermal dissociation temperature of the Group III-V compound semiconductor. In view of the conditions above, the post annealing temperature may be, for example, from about 400° C. to about 850° C.

Following such steps as above, as shown in FIG. 2C, the dielectric layer 100, in which the desired refractive index and absorptivity amounts are satisfied, may be obtained. The surface roughness of the dielectric layer 100 may be about 3 nm or less, or may have a lower surface roughness, for example, 1 nm or less, by adjusting post annealing conditions.

Next, the anti-oxidant layer 120 is removed. For example, the removing process may be performed by a wet etching process. Following such procedures, as shown in FIG. 2D, the optical thin film 1000, in which the dielectric layer 100 is formed on the support layer (SU), the dielectric layer 100 being crystallized, and having the desired refractive index, absorptivity, and satisfactory surface roughness, may be obtained.

The dielectric layer 100 may be patterned into nanostructures (not shown) of various desired shapes, and such nanostructures may be applied to various meta-optical devices to be described later. The patterning process is not particularly limited and may be performed by, for example, an e-beam lithography process.

Hereinafter, meta-optical devices using the dielectric layer 100 detailed above will be described.

FIGS. 5 to 13 illustrate schematic structures of meta-optical devices according to various embodiments of the present disclosure.

Figure 5:
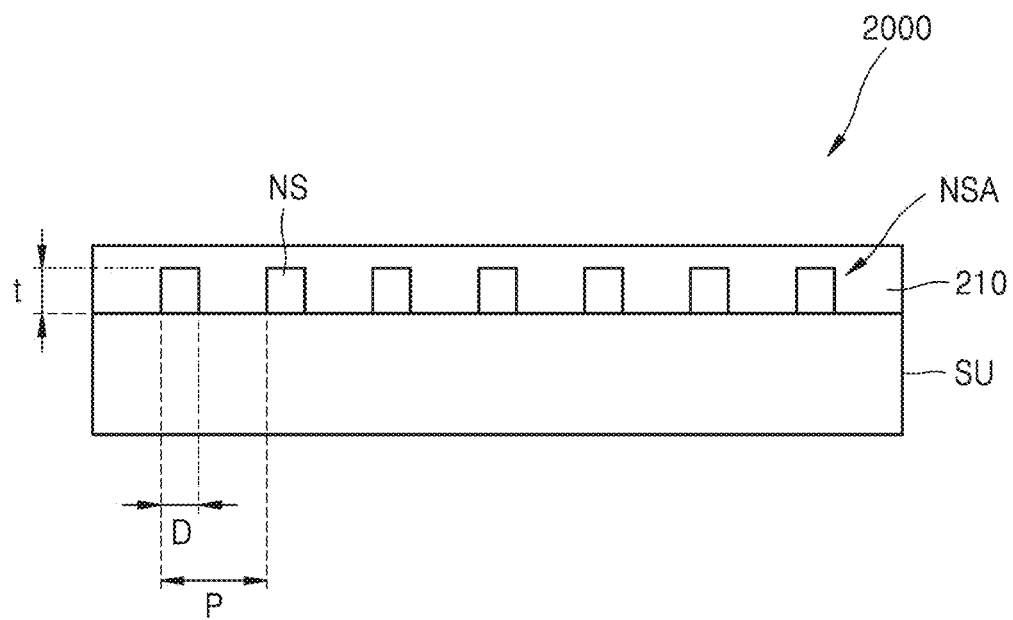
FIGS. 5 to 13 illustrate schematic structures of meta-optical devices according to various embodiments of the present disclosure.

FIG. 5 is a cross-sectional view illustrating a schematic structure of a meta-optical device 2000 according to an embodiment.

The meta-optical device 2000 includes a plurality of nanostructures NS, which may be arranged to form a shape distribution in which the phase of incident light is changed according to a desired and/or alternatively predetermined rule relative to different positions, and which include a shape dimension of a sub wavelength. The sub wavelength may be defined as the wavelength smaller than the wavelength of incident light of which phase is to be modulated. A 'shape dimension' may refer to dimensions such as a width D and a thickness t which define the shape of the nanostructures NS, and in the meta-optical device 2000, at least one of the shape dimensions as described may be a sub wavelength. The distance between the centers of adjacent nanostructures NS may be represented by a pitch P, and the pitch P may also be a sub wavelength.

The width D, the thickness t, and the pitch P of the plurality of nanostructures NS may be arranged according to desired and/or alternatively predetermined rules relative to different positions, and a nanostructure array NSA arranged as such may be desired and/or alternatively predetermined according to the desired phase modulation form regarding light of a desired wavelength band. The wavelength band as such may be in a range of about 300 nm to about 1,000 nm, or may be in the range of about 400 nm to about 750 nm and in the range of about 700 nm to about 1,000 nm.

The nanostructures NS may be formed on the support layer SU. The support layer SU may be made of a material having a refractive index smaller than that of the nanostructures NS. The nanostructures NS may be made of the material forming the dielectric layer 100 as described above. In other words, the nanostructures NS may be formed of a compound including a Group 3 element A, a Group 5 element D, an element X having an atomic weight smaller than the atomic weight of A or D. The compound as such may be represented as GaPX or AlAsX, and X may be Al, N, P or O. As detailed in the description of FIG. 1, the compound as such may be embodied in various membered compounds such as ternary, quaternary, 5-membered, and 6-membered compounds.

The protective layer 210 covering the plurality of nanostructures NS may be further formed on the support layer SU. The protective layer 210 may be formed of a material having a refractive index smaller than that of the nanostructures NS. The protective layer 210 may be made of a material having the same refractive index as the support layer SU. However, the present disclosure is not limited thereto. The protective layer 210 may be formed of $SiO_2$, $Si_3N_4$, spin on glass (SOG), glass, or the like. The protective layer 210 may be omitted.

The dielectric material, as described above, which constitutes the nanostructures NS, may have a high refractive index and low loss. A high refractive index may increase the modulation efficiency of modulation of the incident light on the nanostructures NS. In other words, for widening the range of phase modulation by adjusting the shape, distribution, and arrangement of the nanostructure array NSA, high refractive index is advantageous. This phase modulation appears in the form of a transmission phase, and thus, when loss is high (high absorptivity), that is, when the extinction coefficient k is high, the efficiency, with which modulated light may be used, is low. The dielectric material constituting the nanostructures NS of an embodiment exhibits a high refractive index and a low absorptivity, and thus the modulation range may be widened and light efficiency may be increased, thereby allowing light to be modulated in various shapes as desired.

Hereinafter, meta-optical devices according to various embodiments will be described.

Figure 6:
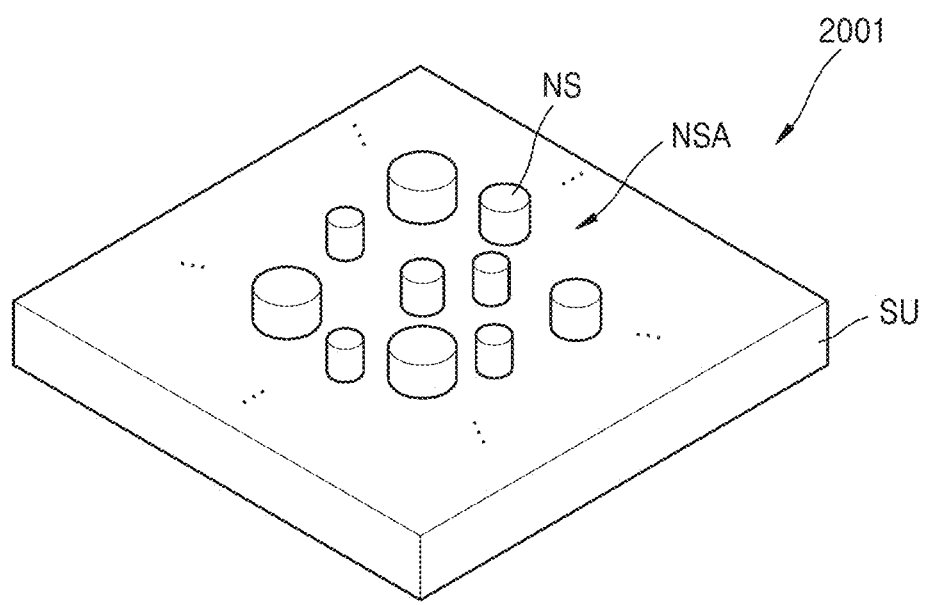

FIG. 6 is a perspective view illustrating a schematic structure of a meta-optical device according to an embodiment.

As illustrated, the nanostructures NS may have cylindrical shapes, of which the cylinders of various diameters may be arranged at appropriate locations to form the nanostructure array NSA.

The nanostructure array NSA may be a periodic array, a quasi-periodic array, a random array, or a quasi-random array. The nanostructures NS are illustrated as cylinders, but are not limited thereto, and may have elliptic pillar shapes or various polygonal pillar shapes.

Figure 7:
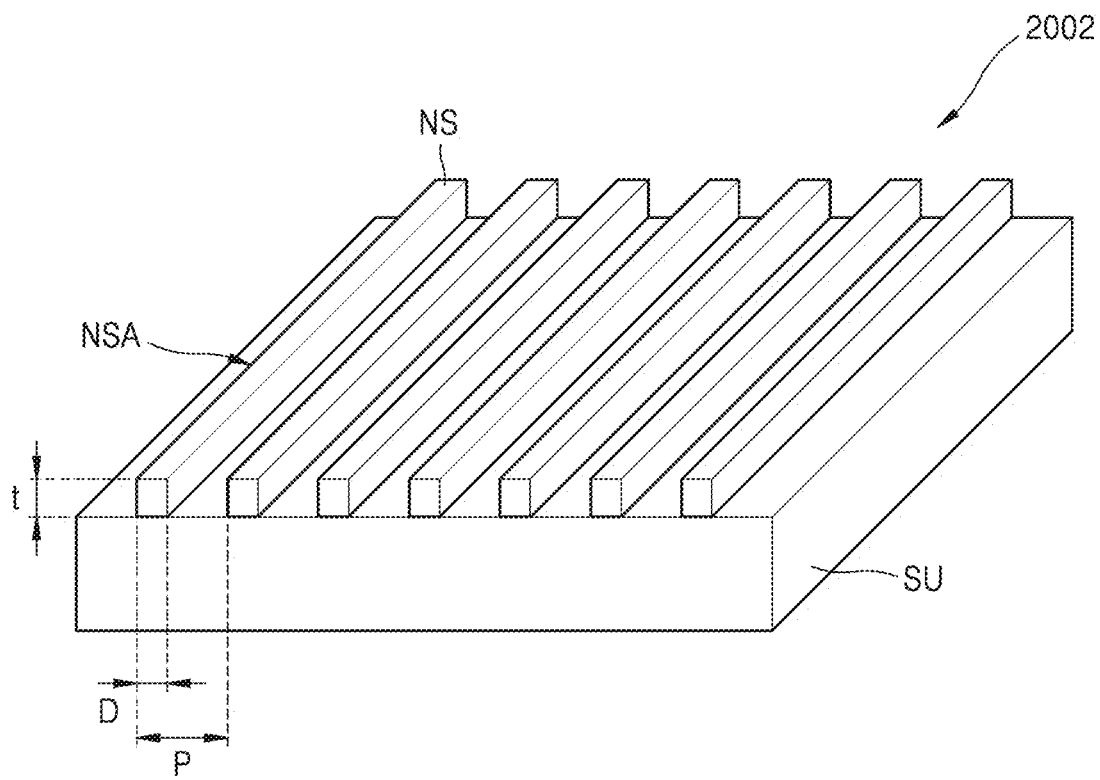

FIG. 7 is a perspective view illustrating a schematic structure of a meta-optical device according to an embodiment.

In the present embodiment, the meta-optical device 2002 may include a nanostructure array NSA in which nanostructures NS are arranged one-dimensionally in the form of stripes. The width D of each of the stripes may be illustrated to be constant but may vary relative to positions.

Figure 8:
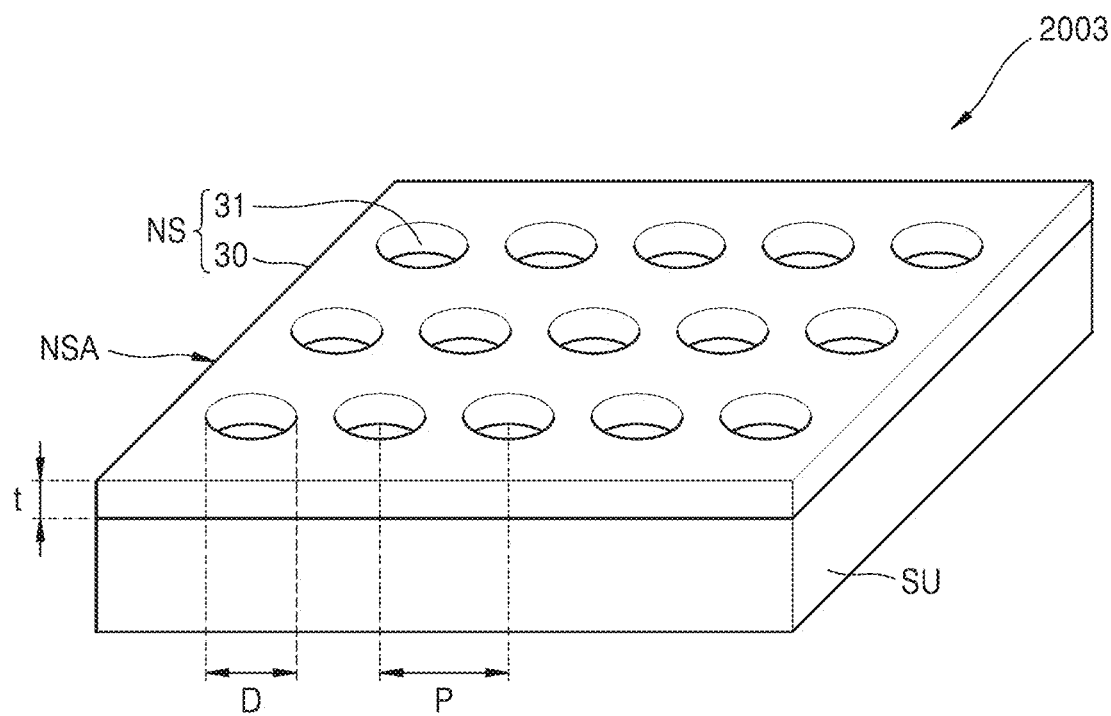

FIG. 8 is a perspective view illustrating a schematic structure of a meta-optical device according to an embodiment.

The meta-optical device 2003, according to the present embodiment, differs from the meta-optical devices 2000, 2001, and 2002 in that the nanostructures NS of the meta-optical device 2003 have an engraved cylindrical shape. In other words, in the aforementioned embodiments, the nanostructures NS may be have a protruding form, but the nanostructures may be engraved, more specifically, may be implemented as nano-hole structures.

On the support layer SU, a nanostructure forming layer 30 may be formed of the materials constituting the dielectric layer 100 as described with reference to FIG. 1. The nanostructures NS may be a plurality of engraved recesses 31 formed in the nanostructure forming layer 30. The recesses 31 are illustrated as each having a cylindrical shape, but this is merely an example. The recesses 31 may each have an elliptical columnar shape, a polygonal columnar shape, or a stripe shape. All of the nanostructures to be described in the following embodiments may be modified have an engraved form as shown in FIG. 8.

Figure 9:
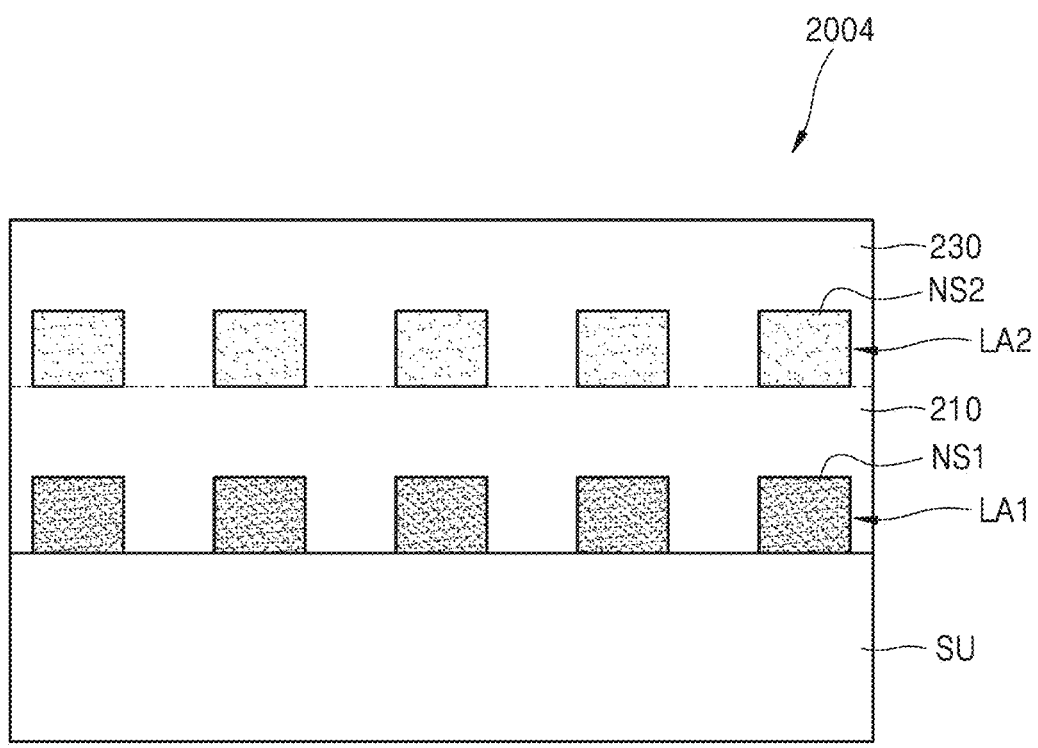

FIG. 9 is a cross-sectional view illustrating a schematic structure of a meta-optical device according to an embodiment.

A meta-optical device 2004 may include a plurality of first nanostructures NS1 constituting a first layer LA1 formed over the support layer SU, and may also include a plurality of second nanostructures NS2 constituting a second layer LA2 formed apart from the first layer LA1.

The plurality of first nanostructures NS1 form the first layer LA1, a protective layer 210 may be provided to cover the plurality of first nanostructures NS1, and the plurality of second nanostructures NS2 may be arranged on the protective layer 210 to form the second layer LA2. A protective layer 230 made of materials having a refractive index smaller than that of the second nanostructure NS2 may be further provided on the second nanostructure NS2 to cover the plurality of second nanostructures NS2. The protective layer 230 may be omitted.

The first layer LA1, in which the plurality of first nanostructures NS1 are arranged, and the second layer LA2, in which the plurality of second nanostructures NS2 are arranged, may each act as a reflector. The meta-optical device 2004 may be a structure having two reflectors separated at a desired and/or alternatively predetermined distance, and may function as an optical filter by forming a resonance structure for light of a specific wavelength.

In a case in which the first nanostructures NS1 and the second nanostructures NS2 are formed to have stripe forms as shown in FIG. 7, the meta-optical device 2004 may be an optical filter acting on light having a polarization in the longitudinal direction, more specifically, may be a polarization-dependent optical filter.

Alternatively, in a case where the first nanostructures NS1 and the second nanostructures NS2 are formed in cylindrical or regular polygonal shapes, the meta-optical device 2004 may be an optical filter acting on all polarized light, more specifically, may be a polarization-independent optical filter.

The first nanostructures NS1 and the second nanostructures NS2 may be all shown as having the same width and spacing, but this is merely an example, and the widths and spacing of the first nanostructures NS1 and the second nanostructures NS2 may be different from each other.

The first nanostructures NS1 and the second nanostructures NS2 may be formed of the materials constituting the dielectric layer 100 as described above. In addition, the same materials may be applied to the first layer LA1 and the second layer LA2. However, the present embodiment is not limited thereto, and the first layer LA1 and the second layer LA2 may be categories of the dielectric layer 100 described above, and may be formed of different materials.

Figure 10:
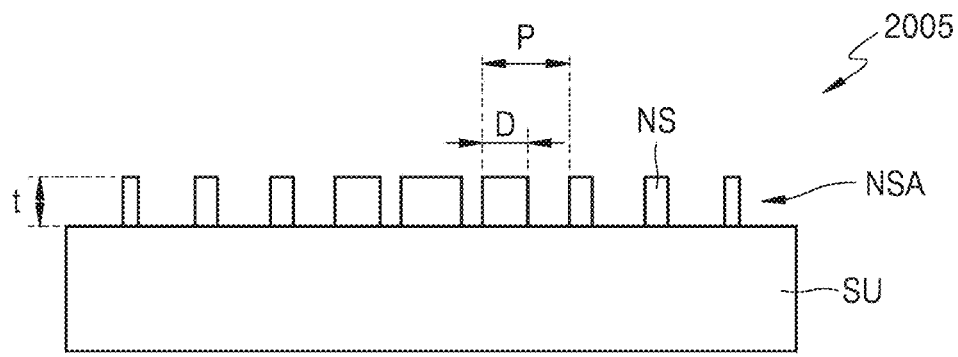

FIG. 10 is a cross-sectional view illustrating a schematic structure of a meta-optical device according to an embodiment.

A meta-optical device 2005 of the present embodiment may include a nanostructure array NSA in which nanostructures NS are arranged, and thus may function as a convex lens.

The nanostructures NS are arranged in the nanostructure array NSA such that the width D of each of the nanostructures NS gradually decreases from the center to the periphery of the nanostructure array NSA. Such an arrangement may be repeatedly formed multiple times from the center towards the periphery. The degree of convexity (positive refractive power) may be adjusted by adjusting the degree to which the width D changes, the number of repeated regions, and the like.

Figure 11:
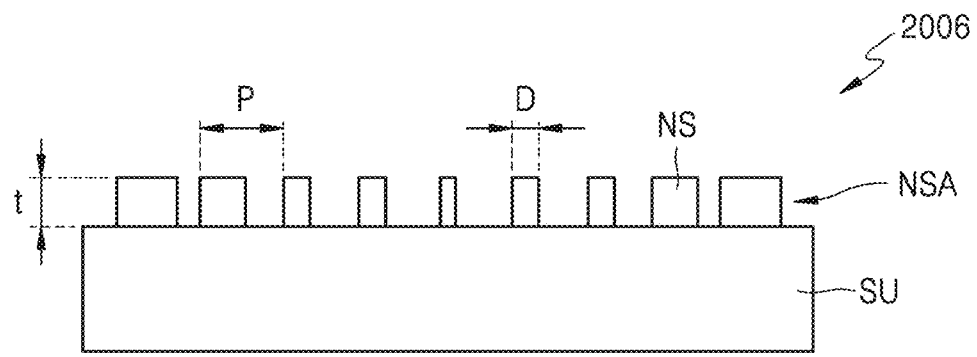

FIG. 11 is a cross-sectional view illustrating a schematic structure of a meta-optical device according to an embodiment.

A meta-optical device 2005 of the present embodiment may include a nanostructure array NSA in which nanostructures NS are arranged, and thus may function as a convex lens.

The nanostructures NS are arranged in the nanostructure array NSA such that the width D of each of the nanostructures NS gradually increases from the center to the periphery of the nanostructure array NSA. Such an arrangement may be repeatedly formed multiple times from the center towards the periphery. The degree of concaveness (negative refractive power) may be adjusted by adjusting the degree to which the width D changes, the number of repeated regions, and the like.

Figure 12:
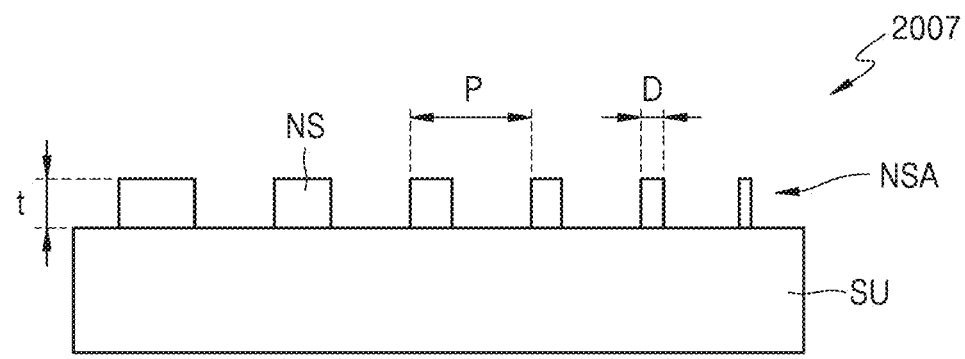

FIG. 12 is a cross-sectional view illustrating a schematic structure of a meta-optical device according to an embodiment.

A meta-optical device 2007 of the present embodiment includes a nanostructure array NSA in which nanostructures NS are arranged, and thus functions as a beam deflector.

The nanostructures NS are arranged in the nanostructure array NSA such that the width D of each of the nanostructures NS gradually decreases in one direction. The angle at which the incident light is deflected may be adjusted by adjusting the degree to which the width D changes.

Figure 13:
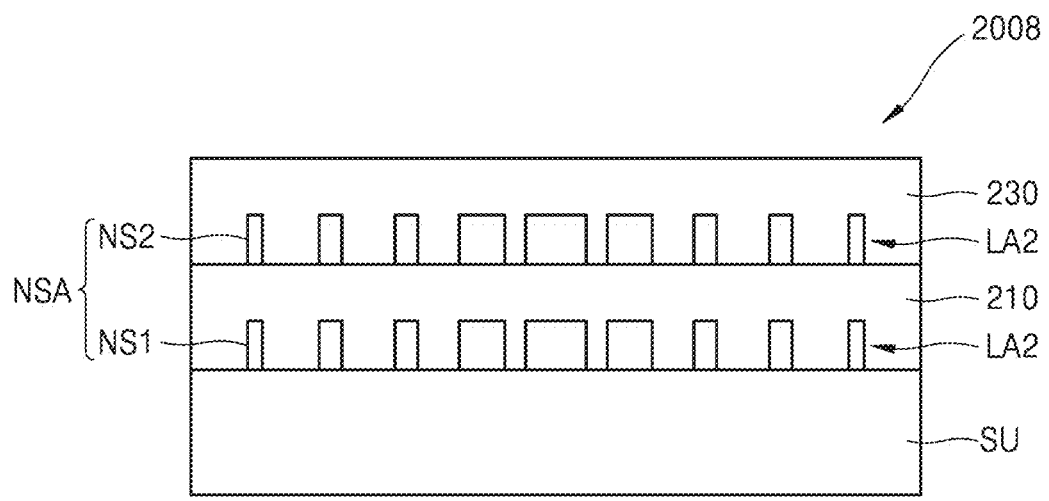

FIG. 13 is a cross-sectional view illustrating a schematic structure of a meta-optical device according to an embodiment.

A meta-optical device 2008 of the present embodiment may include a nanostructure array NSA in which nanostructures NS1 and NS2 are arranged in a plurality of layers, wherein the plurality of layers are arranged at different distances from the support layer SU.

The plurality of first nanostructures NS1 constitute the first layer LA1, wherein a protective layer 210 may be provided to cover the plurality of first nanostructures NS1, and the plurality of second nanostructures NS2 may be arranged over the protective layer 210, thereby constituting the second layer LA2. A protective layer 230 covering the plurality of second nanostructures NS2 may be further provided on of the second nanostructures NS2. The protective layer 230 may be omitted. In the nanostructure array NSA, which is defined by the arrangement of the first nanostructure NS1 and the second nanostructure NS2, the distribution of the nanostructures may be suitable for a desired and/or alternatively predetermined optical function. As described in the embodiments above, in order for the meta-optical device 2008 to function as a concave lens, a convex lens, a beam deflector, or the like, the arrangement of the first nanostructure NS1 of the first layer LA1 and the arrangement of the second nanostructure NS2 of the second layer LA2 may be determined accordingly. Arranging the nanostructures in the plurality of layers allows more precise performance control. The plurality of layers are illustrated as two layers in the embodiments above but may be three or more layers. Although the first layer LA1 and the second layer LA2 are illustrated as having the same shape and arrangement, such illustration is provided solely for convenience of illustration, and the shape or arrangement thereof may be modified.

In addition, the first nanostructure NS1 and the second nanostructure NS2 may be formed of the materials constituting the dielectric layer 100 as described above, and these same materials may be applied to the first layer LA1 and the second layer LA2. However, the present embodiment is not limited thereto, and different materials from each other, which may be included in the above-described category of the dielectric layer 100, may be used for the first layer LA1 and the second layer LA2.

As described with the embodiments, the optical filter, the concave lens, the convex lens, and the beam deflector may be formed depending on the form of the nanostructure array NSA, as thin and flat. In addition, the nanostructure array NSA may be configured such that the meta-optical device functions as a convex mirror, a concave mirror, a beam splitter, a color filter, a spectrometer, or the like. In addition, light modulation of polarized light may be possible when the nanostructures of the nanostructure array NSA have an asymmetric form.

The meta-optical devices as described above have thin-flat forms and provide light modulation of the desired form by using dielectric materials having a high refractive index and low absorptivity, and thus the meta-optical devices may be implemented in various optical devices and electronic devices. For example, the meta-optical devices may be employed in alight source, an image sensor, an imaging device, an object recognition device, or the like.

The optical thin film as described above may exhibit light transmission having a high refractive index and low loss.

The optical thin film described above may be patterned onto a meta surface and applied to the meta-optical devices.

The meta-optical devices as described above may be advantageous for implementing the function of light modulation of a desired form, for light of a desired wavelength band, and in addition, also advantageous for widening the modulation range and increasing light efficiency.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An optical thin film comprising:
a support layer; and
a dielectric layer on the support layer, wherein
the dielectric layer has a refractive index that is greater than a refractive index of the support layer,
the dielectric layer includes a compound $ADX_a$,
the compound ADX includes a Group 3 element A, a Group 5 element D, an element X having an atomic weight that is smaller than an atomic weight of the element A or an atomic weight of the element D,
wherein $0<a<1$, and $ADX_a$ has a refractive index of greater than 3 and an absorptivity of less than $3\times10^{-3}$ for a light in a visible wavelength range.

2. The optical thin film according to claim 1, wherein the compound ADX includes $GaPX$ or $AlAsX_a$, wherein $0<a<1$.

3. The optical thin film according to claim 1, wherein X is Al, N, P, or O.

4. The optical thin film according to claim 1, wherein, the element A and the element D are set such that the compound AD has a refractive index of greater than 3.3 and an absorptivity of less than 0.05 for light in a visible wavelength range.

5. A meta-optical device comprising:
the optical thin film according to claim 1, wherein
the dielectric layer includes a plurality of nanostructures located on the support layer and arranged to form a shape distribution that changes a phase of incident light according to a desired rule according to positions,
the plurality of nanostructures each include the compound $ADX_a$, wherein $0<a<1$, and
the plurality of nanostructures have a shape dimension smaller than a wavelength of the incident light.

6. The meta-optical device according to claim 5, wherein the compound ADX includes GaPX or $AlAsX_a$, wherein $0<a<1$.

7. The meta-optical device according to claim 5, wherein X is Al, N, P, or O.

8. The meta-optical device according to claim 5, wherein the wavelength of the incident light is in a range of about 300 nm to about 1,000 nm.

9. The meta-optical device according to claim 5, wherein the plurality of nanostructures each have a cylindrical shape, a polygonal column shape, or a stripe shape.

10. The meta-optical device according to claim 5, further comprising:
a protective layer formed of a material having a refractive index smaller than a refractive index of the compound $ADX_a$, wherein $0<a<1$, and
the protective layer covers the plurality of nanostructures.

11. The meta-optical device according to claim 5, wherein the plurality of nanostructures are arranged as a plurality of layers spaced apart from the support layer by different distances.

12. The meta-optical device according to claim 5, wherein a shape distribution of the plurality of nanostructures is set such that the meta-optical device is configured to function as a lens, a beam deflector, a beam splitter, a resonator, or a color filter.

13. An electronic device comprising: the meta-optical device according to claim 5.

14. The optical thin film according to claim 1, wherein the compound $ADX_a$ is a crystallized $ADX_a$ compound, wherein $0<a<1$, and X is Al, N, or P.

* * * * *